(12) United States Patent
Zarecki et al.

(10) Patent No.: US 12,135,819 B2
(45) Date of Patent: Nov. 5, 2024

(54) TARGETED TRANSCRIPT ANALYSIS AND REDACTION

(71) Applicant: State Farm Mutual Automobile Insurance Company, Bloomington, IL (US)

(72) Inventors: Kimberly Zarecki, Bloomington, IL (US); Kevin Lucht, Lexington, IL (US); Srinivasarao Kosaraju, Bloomington, IL (US); Nagasudha Ravinuthala, Normal, IL (US); Satya Ravinuthala, Normal, IL (US); Donna Gerig, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 292 days.

(21) Appl. No.: 17/687,983

(22) Filed: Mar. 7, 2022

(65) Prior Publication Data
US 2022/0292218 A1 Sep. 15, 2022

Related U.S. Application Data

(60) Provisional application No. 63/158,724, filed on Mar. 9, 2021.

(51) Int. Cl.
*G06F 21/62* (2013.01)
*G06F 18/22* (2023.01)
(Continued)

(52) U.S. Cl.
CPC .......... *G06F 21/6254* (2013.01); *G06F 18/22* (2023.01); *G06F 40/279* (2020.01); *H04M 11/10* (2013.01)

(58) Field of Classification Search
None
See application file for complete search history.

(56) References Cited

U.S. PATENT DOCUMENTS

| 8,477,915 B1 | 7/2013 | Vasquez et al. |
| 8,644,457 B1 | 2/2014 | Vasquez et al. |
| (Continued) | | |

OTHER PUBLICATIONS

Cumby et al., A Machine Learning Based System for Semi-Automatically Redacting Documents. Proceedings of the AAAI Conference on Artificial Intelligence, Aug. 11, 2011, 25(2), 1628-1635 (Year: 2011).*

*Primary Examiner* — Jeffrey R Swearingen
(74) *Attorney, Agent, or Firm* — Lee & Hayes, P.C.

(57) ABSTRACT

Various techniques described herein relate to analyzing and redacting information from customer interaction records such as call transcripts, to support transmission of the interaction records from a secured environment to various external analytics systems. Transcript texts may be received and processed by a redaction system, during which the transcript texts may be analyzed to generate conversations and convert numerical texts into numbers. One or more regular expressions defining search and replace patterns may be selected and used to redact confidential or sensitive information from the transcripts. In various implementations, the regular expressions used to redact transcripts may be determined or generated based on transcript categorization, the security characteristics of the transmission networks and/or external systems to which the redacted transcripts are to be transmitted, and/or other attributes of the transcript or the associated systems.

19 Claims, 9 Drawing Sheets

(51) Int. Cl.
*G06F 40/279* (2020.01)
*H04M 11/10* (2006.01)

(56) References Cited

U.S. PATENT DOCUMENTS

| | | |
|---|---|---|
| 9,437,207 B2 | 9/2016 | Jacob et al. |
| 9,641,681 B2 | 5/2017 | Nuta et al. |
| 9,875,647 B1 | 1/2018 | Tannenbaum et al. |
| 9,911,412 B2 | 3/2018 | Labsky et al. |
| 10,002,639 B1 | 6/2018 | Gaeta et al. |
| 10,388,272 B1 | 8/2019 | Thomson et al. |
| 10,554,817 B1 | 2/2020 | Sullivan et al. |
| 11,250,876 B1 | 2/2022 | McCloskey et al. |
| 2013/0212701 A1* | 8/2013 | Warrington .......... G06Q 10/107 726/27 |
| 2014/0012719 A1* | 1/2014 | Schrichte .............. G06F 40/117 705/40 |
| 2014/0304594 A1* | 10/2014 | Pittenger ................ G06F 40/10 715/243 |
| 2015/0071542 A1* | 3/2015 | Dahl .................... G06V 30/226 382/177 |
| 2018/0285591 A1* | 10/2018 | Thayer ................ G06F 21/6254 |

\* cited by examiner

300

| Word/Utterance | Start Time | End Time | Speaker | Confidence |
|---|---|---|---|---|
| "Hello?" | 13:30:56.21 | 13:30:57.14 | 1 | 0.85 |
| "Good" | 13:30:59.61 | 13:30:59.92 | 1 | 0.96 |
| "Morning" | 13:31:00.13 | 13:31:01.08 | 1 | 0.95 |
| "Thank" | 13:31:02.04 | 13:31:02.27 | 2 | 0.84 |
| "You" | 13:31:02.33 | 13:31:02.57 | 2 | 0.71 |
| "For" | 13:31:02.65 | 13:31:02.85 | 2 | 0.95 |
| "Calling" | 13:31:03.16 | 13:31:03.77 | 2 | 0.85 |
| "ABC" | 13:31:03.93 | 13:31:04.81 | 2 | 0.82 |
| "Company" | 13:31:04.98 | 13:31:05.60 | 2 | 0.95 |
| "May" | 13:31:06.78 | 13:31:07.13 | 2 | 0.94 |
| "I" | 13:31:07.28 | 13:31:07.42 | 2 | 0.95 |
| "Have" | 13:31:07.66 | 13:31:08.09 | 2 | 0.97 |
| "Your" | 13:31:08.27 | 13:31:08.68 | 2 | 0.96 |
| "Name" | 13:31:08.87 | 13:31:09.10 | 2 | 0.95 |
| "And" | 13:31:09.17 | 13:31:09.31 | 2 | 0.84 |
| "Account" | 13:31:09.36 | 13:31:09.81 | 2 | 0.71 |
| "Number?" | 13:31:09.94 | 13:31:10.23 | 2 | 0.95 |
| "Andrew" | 13:31:12.78 | 13:31:13.55 | 1 | 0.75 |
| "And" | 13:31:13.70 | 13:31:13.93 | 1 | 0.92 |
| "Um" | 13:31:14.01 | 13:31:14.66 | 1 | 0.34 |
| "One" | 13:31:16.87 | 13:31:17.02 | 1 | 0.84 |
| "Two" | 13:31:17.32 | 13:31:17.71 | 1 | 0.98 |
| "Three" | 13:31:18.05 | 13:31:18.46 | 1 | 0.63 |
| ... | ... | ... | ... | ... |

Customer: Hello?

Representative #1: Good morning. Thank you for calling ABC Company. May I have your name and card number?

Customer: Andrew, and um, one two three four five six seven eight nine zero one two.

Representative #1: Thank you! And for verification purposes may I have your address and birthday?

Customer: One two three Main Street. January eighth, nineteen ninety.

Representative #1: Thank you very much. And this is regarding your accident claim filed on September eighth, is that correct?

Customer: Yes

Representative #1: OK. I also have our claim specialist, Danielle, on the line.

Representative #2: Hello.

Representative #1: If we happen to get disconnected during this call, is there a good call back number I can reach you at?

Customer: Yes. Nine four seven eight eight three two.

Representative #1: Great, and if you need to reach me again my representative number is four four seven two five.

Customer: OK.

Representative #2: Hi Andrew, I understand you have agreed to settlement payment of two thousand five hundred dollars for your vehicle damage. Is that correct?

Customer: Yes.

TARGETED TRANSCRIPT ANALYSIS AND REDACTION

RELATED APPLICATIONS

This application claims priority to and is a non-provisional of U.S. Patent Application No. 63/158,724, filed Mar. 9, 2021, and entitled "TARGETED TRANSCRIPT ANALYSIS AND REDACTION," the disclosure of which is incorporated by reference herein in its entirety for all purposes.

BACKGROUND

Large organizations often use automated contact centers to provide and manage interactions between representatives of the organization and customers or other parties. Different types of organizations, including businesses, government agencies, and educational institutions may use automated contact centers for sales, customer service, technical and software support, problem resolution, and the like. Automated contact centers may be small or large-scale, and may support electronic interactions between customers and representatives in various different roles and/or different departments. The representative computer systems within the automated contact center may be distributed across different datacenters, geographic locations, and/or communication networks, and may interact with customer devices using various different communication services or channels provided by the automated contact center, such as voice calls, video sessions, email, web chat sessions, etc.

Electronic records of customer interactions, such as transcripts and metadata, may include various pieces of sensitive or confidential information that must be securely stored and managed by the automated contact center. For instance, call transcripts or other customer interaction records generated by an automated contact center may include personally identifiable information (PII) such as the customer's name address, email, telephone number, date of birth, passport number, driver's license number, social security number, and/or biometric data. Unauthorized disclosure of PII data may be a violation of state or federal laws, and may result in fines, legal liability, and/or negative publicity for the organization operating the automated contact center. Customer interaction records generated by automated contact centers also may include Payment Card Industry Data Security Standard (PCI DSS) data such as credit card or payment card data, financial account numbers, PINS, and/or other financial information of the customer.

To remove PII, PCI DSS, and/or other sensitive or confidential information from customer interaction records, automated contact centers may use various redaction techniques in the which the sensitive or confidential data is masked or removed from a customer interaction record. During a redaction process, which also may be referred to as a data anonymization and/or de-identification process, text search patterns may be used to identify and remove/replace potentially sensitive or confidential data from a customer interaction record. However, conventional redaction tools are often ineffective and fail to provide sufficient data security. For instance, some conventional redaction tools require users to upload unredacted data to an external computing system or third-party service to perform the redaction process. Within such systems, the transmission of the unredacted data may provide a window for the sensitive information to be intercepted and exploited by compromising the transmission network or a downstream system, and thus may itself constitute a breach of fiduciary duty and/or a violation of law. Additionally, transmitting large volumes of unredacted data to third-party systems or services over transmission networks may be computationally inefficient and/or prohibitively expensive.

Furthermore, call transcripts and/or other customer interaction records generated by an automated contact center are often proprietary in nature and may not fit standardized redaction data schemas provided by conventional de-identification and redaction tools. Accordingly, conventional redaction tools may include standard pattern templates for redacting well-known information, such as telephone numbers, social security numbers, etc., but may not provide capabilities for redacting domain-specific information, such as insurance policy numbers, account numbers, medical procedure information, accident descriptions, etc. As a result, applying conventional redaction tools to the customer interaction records from an automated contact center may result in failures to redact organization-specific sensitive or confidential customer data, and/or in unnecessary redactions of non-sensitive or non-confidential data.

SUMMARY

To address these and other problems and inefficiencies, this disclosure describes systems and techniques for targeted analysis and redaction of customer interaction records such as transcripts, thereby allowing those transcripts to be transmitted from a secured environment to external analytics systems and environments. In various examples described herein, a redaction system may receive and process transcripts texts, generate conversations, and convert numerical text within the transcripts into numbers. The redaction system also may select and/or generate regular expressions that define search and replace patterns, and use the regular expressions to redact sensitive or confidential information from the transcripts. In various examples, a redaction system may determine one or more regular expressions for redacting a transcript based on a transcript analysis categorization processes, the security characteristics of the transmission networks and/or external systems to which the redacted transcripts are to be transmitted, and/or various other attributes of the transcript or associated systems.

In an example of the present disclosure, a method includes receiving, by a first computer system, a transcript text, and determining, by the first computer system, a transcript category associated with the transcript text. The method also includes determining, by the first computer system, a first expression based at least in part on the transcript category, wherein the first expression defines a first search pattern. Additionally, the method includes modifying, by the first computer system, the transcript text into a first redacted transcript text, by redacting one or more instances of the first search pattern from the transcript text, and transmitting the first redacted transcript text from the first computer system, via a transmission network, to a second computer system.

In another example of the present disclosure, a computer server comprises one or more processors, and one or more non-transitory computer-readable media storing computer-executable instructions that, when executed by the one or more processors, cause the one or more processors to perform various operations. The operations in this example include receiving a transcript text, and determining a transcript category associated with the transcript text. The operations further include determining a first expression based at least in part on the transcript category, wherein the first expression defines a first search pattern. Additionally, the operations in this example include modifying the transcript text into a first redacted transcript text, by redacting one or more instances of the first search pattern from the transcript text; and transmitting the first redacted transcript text from the first computer system, via a transmission network, to a second computer system.

Yet another example of the present disclosure includes one or more non-transitory computer-readable media storing instructions executable by a processor, wherein the instructions, when executed, cause the processor to perform various operations. The operations in this example include receiving a transcript text at a first computer system, and determining an attribute associated with at least one of a second computer system or a transmission network. Additionally, the operations in this example include determining a first regular expression based at least in part on the attribute, wherein the first regular expression defines a first search pattern, and modifying the transcript text into a first redacted transcript text, by redacting one or more instances of the first search pattern from the transcript text. Further, the operations in this example include transmitting the first redacted transcript text from the first computer system, via the transmission network, to the second computer system.

BRIEF DESCRIPTION OF THE DRAWINGS

FIG. 3 illustrates an example transcript text data file, in accordance with one or more examples of the present disclosure.

FIGS. 4A-4C illustrates an example transcript at three stages in a targeted redaction process, in accordance with one or more examples of the present disclosure.

DETAILED DESCRIPTION

Figure 1:
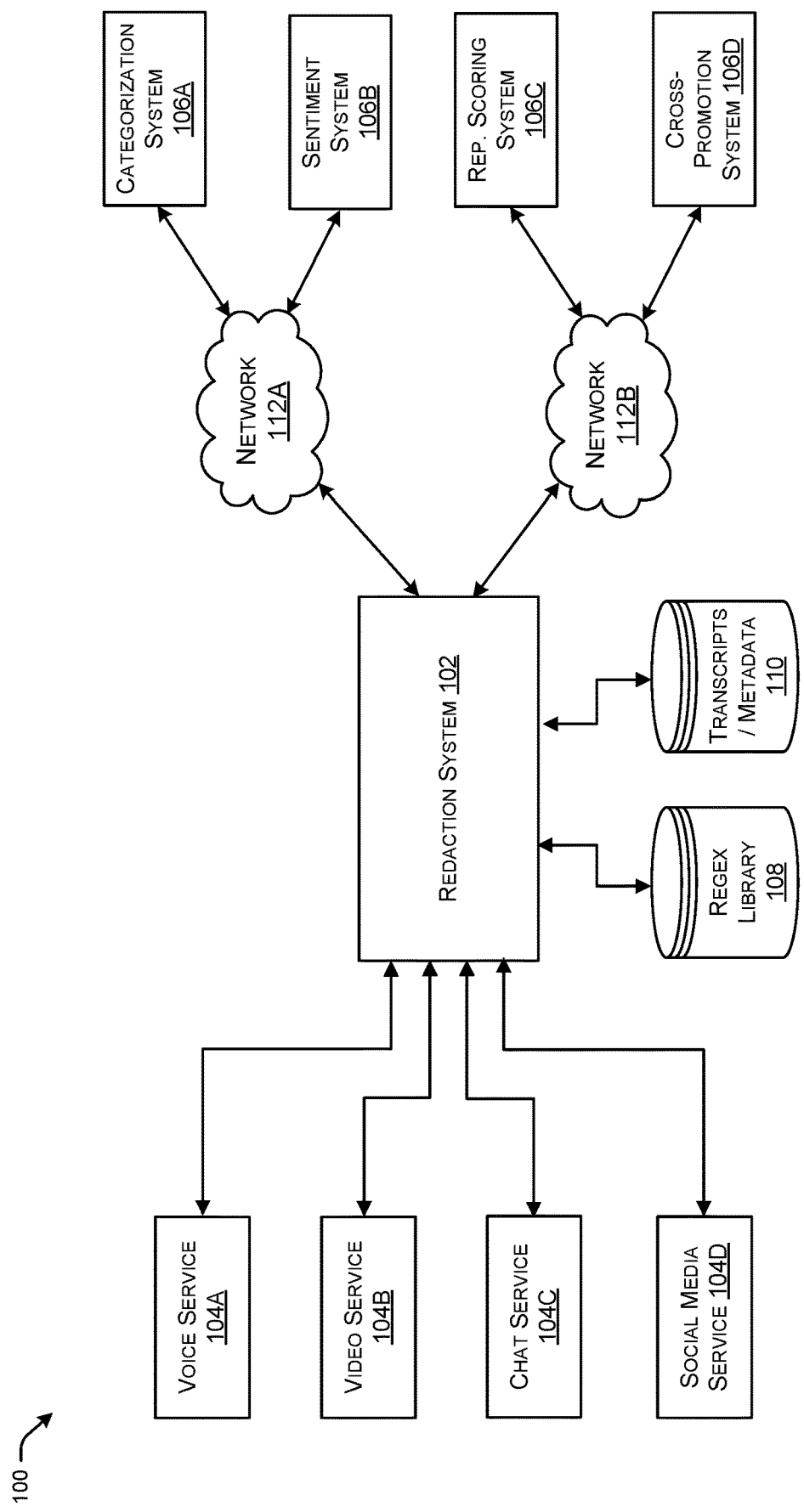
FIG. 1 illustrates a computing environment including a redaction system in communication with various additional internal and/or external systems and services within a contact center environment, in accordance with one or more examples of the present disclosure.

FIG. 1 illustrates an example computing environment 100 associated with an automated contact center. As noted above, the techniques described herein relate to analyzing and redacting data, such as customer interaction records (e.g., call or web chat transcripts) generated by automated contact centers, to allow those records to be safely transmitted and used by external analytics systems and environments. In this example, the computing environment 100 includes a redaction system 102 configured to receive transcript texts and/or other customer interaction records from communication services 104, to analyze the transcripts and perform targeted redactions on the transcripts. As described in the various examples below, the redaction system 102 may be configured to perform limited and targeted redactions of transcripts, rather than over-redacting based on broad PII or PCI text string patterns. For instance, the redaction system 102 may select regular expressions for redacting transcripts based on the organization of the contact center, the communication services, transcript analyses and categorization processes, and/or the downstream systems to which the redacted transcripts are transmitted. Accordingly, the targeted analysis and redaction performed by the redaction system 102 effectively protects sensitive and confidential information within customer interaction records, while also preserving more of the non-sensitive and non-confidential information which improves the quality of the data provided for analytics purposes to one or more analytics systems 106.

Within the computing environment 100, interaction session transcripts (or other customer interaction records) may be provided to the redaction system 102, by the communication services 104 of a contact center. The transcripts received by the redaction system 102 may be stored in any computer-readable transcript format and/or data structure. In some examples, the redaction system 102 may receive metadata associated with a transcript from a communication service 104. For instance, a relational data structure or file may store metadata associated with a customer call, such as the called/calling phones numbers, user identifiers of the call participants, the date and time of the call, the locations of the call participants, the length of the call, the amount of silence during the call, etc.

The redaction system 102 may receive and analyze the transcripts received from the communication services 104, and may determine one or more regular expressions to use to redact the transcripts. A regular expression (or "regex") may define a search pattern that can be used by a regex execution engine to identify and redact (e.g., remove or replace) all matching patterns within a transcript. The regex library 108 may store multiple regexs associated with the contact center, where each regex defines a unique search pattern for data that may be found within a transcript. For instance, a regex to identify social security numbers may be represented by the search pattern "^\d{3}-\d{2}-\d{4}$." As another example, a regex to identify credit card numbers that are between 13-16 digits long and begin with the number two ("2") may be represented by the search pattern "^2[0-9]{12}(?:[0-9]{3})?$." The regex library 108 may store regexs defining general search patterns associated with generic PII or PCI data, as well as organization-specific search patterns associated with the contact center. For instance, for an automated contact center implemented for an insurance company, examples of organization-specific regexs may include specific search patterns to identify customer numbers, account numbers, claim numbers, accident damage descriptions, medical report descriptions, vehicle identifiers, etc.

When analyzing and redacting a transcript, the redaction system 102 may retrieve one or more regexs from the regex library, and execute a regex engine to identify and then redact any data matching the regex search pattern within the transcript. As described in more detail below, the redaction system 102 may determine the regexs used to redact a transcript based on the attributes of the specific transcript, and different regexs may be used to redact different transcripts. For instance, the redaction system 102 may analyze a transcript and may determine one or more regexs to use to redact the transcript based on a topic classification or category of the transcript, the source of the transcript (e.g., a particular communication service 104), the intended destination for the redacted transcript (e.g., a particular analytics system 106), and/or other attributes or analyses of the transcript.

Additionally or alternatively, the redaction system 102 may select the regex(s) to redact a transcript based on the respective security characteristics of the downstream systems (e.g., the system(s) to which the redacted transcript is to be transmitted), and/or the security characteristics of the transmission network(s). In this example, the computing environment 100 includes four downstream analytics systems 106A-106D, any of which may receive a redacted transcript from the redaction system 102 via a network 112. Each of the analytics systems 106 (which may be referred to individually or collectively as downstream analytics system(s) 106) may have different security characteristics based on their respective computing architectures, the hardware and software specifications and operating systems of the analytics systems 106, and the locations of the analytics systems 106 with respect to the redaction system 102 (e.g., operating within the same computer server, the same datacenter, different servers in the same secure network, separate servers/datacenters across unsecure networks, etc.).

Similarly, each of the transmission networks 112A and 112B may have different security characteristics based on the type/media of the transmission networks, the network protocols used for transmission, the number of intermediate network devices between the redaction system 102 and the respective analytics systems 106, and/or the vulnerability of the network(s) 112 to network traffic capture and/or malware. In some cases, a transmission network 112 may include a secure private network such as a private LAN or secure corporate network protected by a firewall. In other cases, the analytics systems 106 may include external analytics systems implemented on separate servers and/or separate datacenters from the redaction system 102. In such cases, the transmission network 112 may include unsecure public networks (e.g., the Internet) and/or may use tunneling and encryption technologies. For internal and/or external analytics systems 106, the networks 112 may include computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like. In various examples, the redaction system 102 may determine the security characteristics associated with a particular downstream analytics system 106 that is to receive the redacted transcript, and/or the transmission network 112 over which the redacted transcript is to be transmitted, and may select the particular regex(s) from the regex library 108 based on the security characteristics.

As shown in the above examples, the redaction system 102 may determine the regexs to use in redacting transcripts, by selecting existing regexs from the regex library 108. In other examples, the redaction system 102 may generate new regexs and/or modify existing regexs from the regex library 108. Regex generation and/or modification processes may be performed after, and/or in response to, receiving a transcript from a communication service 104, and may be based on any combination of the transcript data and transcript analyses techniques described herein. For instance, the redaction system 102 may retrieve a regex from the regex library 108 defining a search pattern for identifying a type of sensitive or confidential data (e.g., payment card data, bank account data, social security number, etc.), and may modify the search pattern to make the regex more or less restrictive for a particular transcript. For instance, the redaction system 102 may analyze a first transcript and determine that the regex should be modified to be more restrictive so that it matches a greater number of text patterns and redacts more data, but for a second transcript may determine that the regex should be modified to be less restrictive so that it matches fewer text patterns and redacts less data.

Determining when and how to modify a regex for a particular transcript may be based on determining a category of the transcript, the security characteristics of a downstream analytics system 106 or a transmission network 112, and/or any other transcript analysis or attributes of the transcript or contact center. When determining that a regex should be modified for a transcript or group of transcripts, the redaction system 102 may use various techniques to modify the regex for the transcript(s) to be more or less restrictive. For instance, to make a regex more restrictive (e.g., for transmission to a less secure external analytics system 106), the redaction system 102 may change the search pattern of the regex to alter the length requirements or spacing requirements of the search pattern to be broader or more flexible, to include partial matches (e.g., partial phone numbers, partial payment card numbers, etc.), and/or to subdivide the search pattern into separate regexs. In contrast, to make a regex less restrictive (e.g., for transmission to a more secure or internal analytics system 106), the redaction system 102 may alter the search pattern of the regex to make the length requirements or spacing requirements of the search pattern more exact, to exclude partial matches, etc.

As shown in FIG. 1, the redaction system 102 may receive unredacted call transcripts (or other customer interaction records) from one or more communication services 104 of the contact center, redact the call transcripts using the various techniques described herein, and may provide the redacted transcripts to one or more analytics systems 106. The communication services 104 may be implemented as internal or external services to the contact center, and may be configured to support interactive communications between customers and representatives over their respective media/communication channels. Four communication services 104 are shown in this example, including a voice communication service 104A configured to provide interactive voice sessions (e.g., phone or VoIP), a video communication service 104B configured to provide interactive video sessions, a chat communication service 104C configured to provide web chat/messaging sessions, and a social media communication service 104D configured to provide social media-based interactive sessions between customers and representatives. As discussed below, in some examples the redaction system 102 may select different regexs and/or may apply different techniques to redact transcripts, based on the particular communication service 104 from which the transcript is received. It can also be understood that the techniques described herein are not limited to transcripts received from communication services 104A-104D, but may be applied to any communication service supporting communication sessions with customers.

In this example, redacted transcripts from the redaction system 102 are provided to one or more downstream analytics systems 106. Analytics systems 106 may be implemented as internal systems or external systems to the contact center, and may be configured to perform various analytics processes based on redacted transcripts. Four analytics systems 106 are shown in this example, including a classification (or categorization) system 106A configured to analyze redacted transcripts and determine one or more categories corresponding to transcript topic, department, call purpose, successful resolution, etc., a sentiment system 106B configured to analyze redacted transcripts and evaluate customer and/or representative sentiments during an interactive session, a representative scoring system 106C configured to analyze a transcript and score the representative using various performance metrics, and a cross-promotion system 106D configured to analyze transcripts to detect potential customer promotions and targeted marketing opportunities. As discussed below, in various examples the redaction system 102 may select different regexs and/or may apply different techniques to redact call transcripts, based on the analytics systems 106 that request and/or receive redacted transcripts from the redaction system 102. It can also be understood that the techniques described herein are not limited to the four analytics systems 106A-106D shown in this example, but may be applied to any internal or external system or service that receives the redacted transcripts generated by the redaction system 102.

As noted above, for the analytics systems 106 (and/or other downstream systems) the quality of the analyses can be improved by providing the analytics systems 106 with transcripts that are minimally redacted to include a larger amount of relevant input data for the analyses. Accordingly, the targeted and limited redactions performed by the redaction system 102 described herein may improve the operation of the analytics systems 106, by providing these systems with minimally redacted transcripts, in which sensitive and confidential information is redacted but more of the non-sensitive and non-confidential information is preserved.

In various examples, the transcript redactions performed by the redaction system 102 may be caused or initiated using various techniques. In some examples, a downstream analytics system 106 may request one or more redacted transcripts from the redaction system 102, or from another system/service of the contact center. For instance, a particular analytics system 106 may request a batch of redacted transcripts and/or may register to receive a transcript stream from the contact center, and may use the redacted transcripts to perform various analytics tasks. In such examples, the redaction system 102 may retrieve transcripts and/or regexs and redact the transcripts in response to the requests received from the analytics systems 106. In other examples, the redaction system 102 may be configured to receive a stream of incoming transcripts from one or more communication services 104, to perform automatic redactions on the received transcripts, and to provide the redacted transcripts to the analytics systems 106 by transmitting the transcripts or making the transcripts available via output queues of the redaction system 102. In some implementations, the redaction system 102 may maintain a transcript/metadata data store 110 to store transcripts and associated metadata in various redacted or unredacted forms. For instance, the transcript/metadata data store 110 may store unredacted transcripts awaiting redaction, transcripts in intermediate stages of redaction, or fully redacted transcripts awaiting transmission to requesting downstream systems.

As noted above, transcripts may be represented as text data (e.g., text files), and in some examples may have associated metadata identifying the participants in the interactive session, the participant phone numbers and/or network addresses, the participant locations, languages used, the starting and ending dates/time, the length of the session, the amount of silence during the interactive session, etc. The redaction system 102 may receive metadata associated with a transcript, and/or may analyze the text of the transcript to extract metadata. In some examples, the redaction system 102 may store the associated metadata for a transcript within the transcript/metadata data store 110 while the transcript redaction processes are performed, and may attach the metadata back to the transcript text file before providing the redacted transcript to a downstream system. Additionally, although the examples described herein include redacting transcripts, it can understand from the context of this disclosure that any or all of the redaction techniques described herein also can be applied to redacting sensitive or confidential information from the metadata associated with transcripts or other customer interaction records. For instance, the redaction system 102 may retrieve and use regexs similar or identical to those used for redacting transcripts, to redact information from the transcript metadata, such as customer phone numbers, customer IP addresses, customer account numbers, and the like.

Various examples described herein include redacting sensitive and confidential information from transcripts of customer interactions with representatives. As used herein, a "transcript" may refer to a call transcript, video session transcript, web chat or messaging session transcript, a social media interaction transcript, or any other record of a customer interaction. For instance, additional examples of transcripts that can be redacted may include emails from customers, and forms filled out and submitted by customers (e.g., insurance forms, medical forms, financial forms, etc.). It can be understood from the context of this disclosure that the redaction techniques described herein also may be performed to any other types of documents containing sensitive or confidential data.

The computing environment 100 depicted in FIG. 1 may be implemented using various different computing architectures in different examples. In some implementations, the redaction system 102 may be implemented on the same computer server and/or the same datacenter as the communication services 104, while one or more of the analytics systems 106 may be implemented separately on external servers. For instance, a datacenter of an automated contact center may include one or more communication services 104 and a redaction system 102, implemented on the same server, same datacenter, and/or within the same secure network, where the redaction system 102 is configured to receive, analyze, and redact transcripts from the communication services 104, before those transcripts are provided to downstream systems. Analytics systems 106 may include both internal systems implemented within the same server, same datacenter, or same secure network as the redaction system 102 and/or communication services 104, or external systems implemented in different servers, different datacenters, and/or different networks.

For an internal analytics system 106, such as a system implemented within the same server or datacenter as the redaction system 102 in a contact center environment, the transmission network 112 may include private corporate networks that are relatively secure and less susceptible to malware attacks. In contrast, for analytics systems 106 that are external to the redaction system 102 and/or the contact center environment, the transmission network 112 may include public networks (e.g., the Internet) and/or wireless access networks that are less secure and more susceptible to malware attacks. Accordingly, the redaction system 102 may perform a more restrictive redaction when transmitting to an external analytics system 106 and/or over a less secure network, and may perform a less restrictive redaction when transmitting to an internal analytics system 106 and/or over a more secure network.

Figure 2:
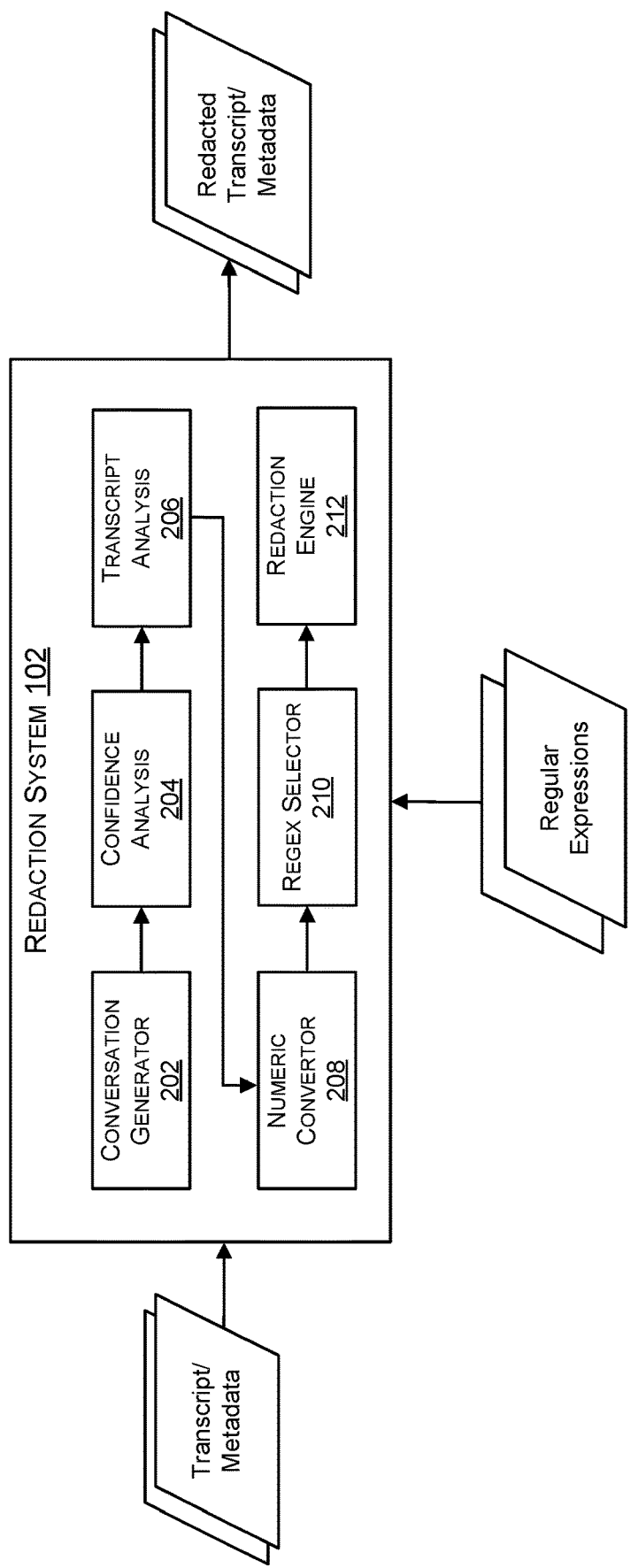
FIG. 2 illustrates an example redaction system and related components, in accordance with one or more examples of the present disclosure.

FIG. 2 illustrates a redaction system 102 including various subcomponents configured to perform targeted analysis and redaction of transcripts. In this example, the redaction system 102 includes a conversation generator 202, a confidence analysis component 204, a transcript analysis component 206, a numeric convertor 208, a regex selector 210, and a redaction engine 212. These and other components may work in conjunction to perform transcript analyses and targeted redactions in a manner that effectively protects sensitive and confidential information, while not over-redacting to preserve more non-sensitive and non-confidential information for use in downstream analytics processes. The example redaction system 102 depicted in FIG. 2 may be similar or identical to the redaction system 102 described above in reference to FIG. 1. In various implementations, some or all of the components 202-212 of the redaction system 102 may be optional, or the operations and functionality of those components may be combined with other components in the same or a different order.

As discussed above, the redaction system 102 may receive unredacted transcripts from a source (or upstream) system, such as the communication services 104 of an automated contact center and/or any other source system configured to provide unredacted documents. The unredacted transcripts may include, for example, transcript files, relational tables of transcript text, and various other forms of text documents. In some cases, an unredacted transcript may be received as a listing of the text words or utterances, and the redaction system 102 may use the conversation generator 202 to construct a conversation based on the listing.

FIG. 3 shows an example transcript text data file 300 that may be received by the redaction system 102 from a communication service 104. In this example, the transcript text data file 300 includes a listing of words/utterances representing a partial conversation between a customer and a contact center representative. For each word or utterance in the listing, the transcript text data file 300 includes start and end timestamp data, a speaker identifier, and a confidence metric (0.00 to 1.00) associated with the word or utterance. Based on the sequences of words/utterances, timestamp data, speaker data, and confidence levels, the conversation generator 202 may convert the transcript text listing into a conversation format text file. For example, FIG. 4A illustrates a transcript file 400, in which the transcript text has been converted into a conversation format. This example depicts a conversation between three parties, two representatives and a customer, relating to the settlement of an insurance claims. However, it should be understood that the transcript redaction and analysis techniques described herein are not limited to contact center environments or insurance claims, but may be used to redact any text data including sensitive or confidential information.

In this example, the confidence analysis component 204 may analyze the unredacted transcript text data to determine confidence metrics associated with specific words, phrases, and/or the conversation as a whole. The confidence analysis component 204 may determine text confidence levels based on an unredacted text listing, such as data file 300, or an unredacted text in conversation form, such as transcript file 400. When word/utterance confidence values are available, as shown in data file 300, the confidence analysis component 204 may use those to calculate confidence levels associated with sentences or phrases, individual speakers, and/or the conversation as a whole. Additionally or alternatively, the confidence analysis component 204 may use other techniques, such as analyzing language and context, detecting homophones and homonyms, measuring the speaker clarity or connection quality, to determine or updated the confidence levels associated with individual words, phrases, and/or the complete conservation represented by the transcript. As discussed below, these confidence levels may be used by the redaction system 102 (e.g., by comparing the confidence levels to one or more confidence thresholds) to determine which regexs are to be used for redacting the text transcript.

The transcript analysis component 206 may be used in some implementations to determine one or more categories associated with the transcript text received from the upstream system. The transcript analysis component 206 may analyze the transcript text and/or conversation and perform one or more categorization operations to determine the categories of the transcript. In some cases, the transcript analysis component 206 also may determine confidence levels associated with the determine transcript categories. A transcript category may refer to a subject matter classification of the transcript, such as customer calls to start or end a service, place or cancel an order, order status inquiries, technical support, account changes, etc. Additionally or alternatively, transcript categories may relate various other types of classifications, such as categorization into the relevant department within an organization (e.g., sales, account services, claim processing, technical support, settlement, etc.), categorization by customer type (e.g., current customer, potential new customer, former customer, etc.), categorization by language spoken in the transcript (e.g., English, Spanish, etc.), and/or categorization by contact session resolution (e.g., customer hang-up, disconnection, successful resolution, call transferred, etc.). Any or all of the categories determined by the transcript analysis component 206 may be used by the redaction system 102 to determine which regexs are to be used for redacting the text transcript.

To determine one or more categories associated with an unredacted transcript, the transcript analysis component 206 may perform one or more analyses on the unredacted transcript text and/or metadata. For instance, the transcript analysis component 206 may detect keywords within the transcript text to categorize the unredacted transcript. Additionally or alternatively, the transcript analysis component 206 may use metadata or other data sources, such as the identities and known attributes of the speakers, the customer and representative client devices, the locations of the parties, the communication services/channels used (e.g., the particular communication service 104), and/or how the communication services/channels were accessed (e.g., the particular phone number called, source web page or link, etc.). As an example, the transcript analysis component 206 may use the type of communication service, the origination of the session, and the customer phone number or network address, along with a transcript keyword analysis, to determine one or more topic categories, speaker categories, language categories, etc. As noted above, various downstream analytics services (e.g., categorization system 106A) may perform additional detailed categorization of the redacted transcript, and some implementations the transcript analysis component 206 may perform a similar or identical analysis, or may perform a simplified and more efficient analysis, to those performed by downstream systems.

The redaction system 102 may use a numeric convertor 208 configured to detect and convert numeric text (e.g., text words representing numbers) within a transcript, into the corresponding numbers. For instance, the numeric convertor 208 may convert "three" to "3", or "forty" to "40", or "second" to "2nd" within an unredacted transcript. In some cases, the numeric convertor 208 may detect and evaluate homophones, so that "too" may be converted to "2", and "ate" may be converted to "8", depending on the confidence levels associated with the transcript text words, a context or conversation analysis, or the categorization of the transcript.

Figure 4B:
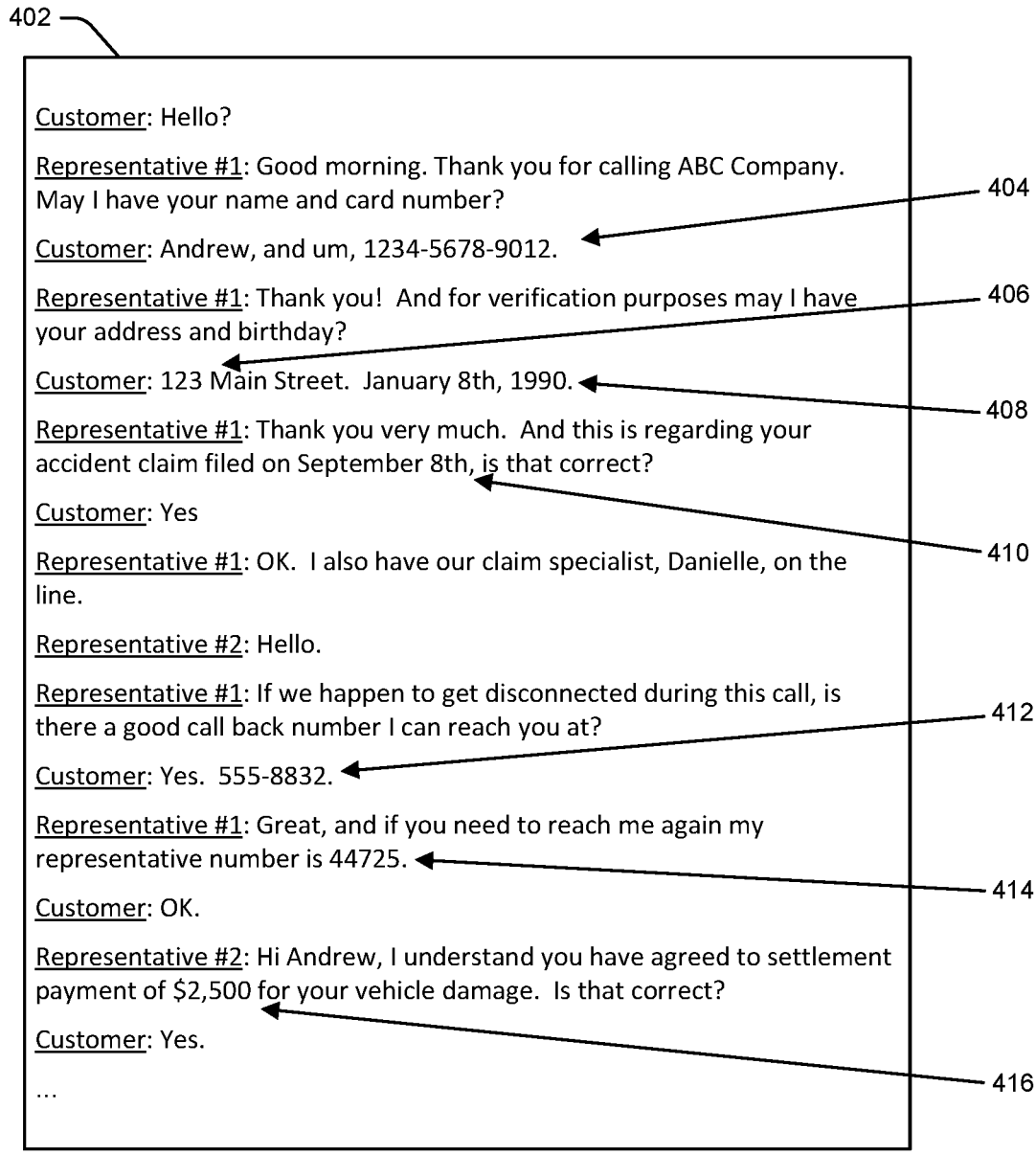

FIG. 4B shows an updated transcript file 402 in a multi-stage redaction process, in which the transcript file 400 from FIG. 4A has been modified using a numeric convertor 208. In this example, the numeric convertor 208 has performed various text-to-number conversions at text locations 404, 406, 408, 410, 412, 414, and 416. In some examples, the numeric convertor 208 also may include a format convertor configured to detect types of numeric data and reformat the numeric data based on the data type. For instance, as shown in FIG. 4B, the numeric convertor 208 may detect an account number (e.g., location 404), an address (e.g., location 406), a date (e.g., locations 408 and 410), a time, a phone number (e.g., location 412), a monetary value (e.g., location 416), and may modify the appropriate spacing, insert dashes, add dollar signs or colons (for time values), change capitalization, and the like, to conform the numeric values to a known data formats which can improve accuracy and efficiency for the subsequent regex-based redaction operations.

The regex selector 210 may be configured to determine one or more regular expressions ("regexs") to be used in the transcript redaction operations. As noted above, each regex may define one or more text search patterns, that can be matched to text within a transcript and used to remove, obscure, or replace, the matching text. When determining the regex for the subsequent transcript redactions, the regex selector 210 may select one or more existing regexs from the regex library 108, may generate new regexs, and/or may retrieve and then modify existing regexs.

In various examples, the regex selector 210 may determine regexs based on any combination of the transcript data and/or transcript analysis techniques described herein. In some cases, the regex selector 210 may determine a standard set of regexs that define patterns for known sensitive and confidential information, such as PII, PCI DSS, and the like. In other cases, the regex selector 210 may determine a custom set of regex (e.g., a limited or targeted set) based the transcript categorization operations described above, the upstream system from which the unredacted transcript was received, and/or the downstream systems (or transmission network) to which the redacted transcript is to be transmitted. As an example, the regex selector 210 may select one set of regexs for transcripts received from a voice service 104A, and a different set of regexs for transcripts received from a chat service 104C, which may depend on the relative security of the telephone and web chat networks, or the types of customers interacting with the contact center through the respective services. As another example, the regex selector 210 may select one set of regexs for transcripts to be transmitted a downstream sentiment system 106B, and a different set of regexs for transcripts to be transmitted to a separate downstream cross-promotion system 106D, which may depend on the relative security downstream systems and/or the transmission networks 112, or the types of the data most valuable to the respective downstream systems. As yet another example, the regex selector 210 may select one set of regexs for transcripts of a first category (e.g., a topic category, language category, customer or representative type category, etc.), and a different set of regexs for transcripts of a second category, which may be based on the likelihood of different types of sensitive or confidential information appearing in transcripts of the associated categories.

Additionally, the regex selector 210 may modify regex retrieved from the regex library 108 and/or newly generated regexs, to make the regexs more or less restrictive when redacting the transcripts. For instance, the regex selector 210 may alter the length or spacing requirements within the text search patterns of a regex to make the regex more or less restrictive. The regex selector 210 also may alter a regex to match (or not match) partial matches of the text search pattern, or may subdivide (or join together) a multi-part regex to make the regex more or less restrictive. The regex selector 210 may determine and perform modifications to regexs based on any combination of the transcript data and/or transcript analysis techniques described herein. For instance, regex selector 210 may modify a regex to make the regex less restrictive when the redacted text is to be transmitted to an internal downstream system over a secure network, or may make the regex more restrictive when the redacted text is to be transmitted to an external downstream system over a less secure network. As another example, the regex selector 210 may modify a regex to make the regex more restrictive when the confidence level associated with matching transcript words (or the confidence level associated with the transcript as a whole) is lower than a confidence threshold, and may modify the regex to be less restrictive when the associated confidence levels meets or exceeds a confidence threshold.

The redaction system 102 also may include a redaction engine 212 configured to perform the transcript redactions by applying the determined regexs to the unredacted transcripts. In various examples, the redaction engine 212 may use the determined regex to detect one or more matching text strings within an unredacted transcripts, and then may remove the matching text strings and/or replace the matching text strings with non-descriptive characters (e.g., "X" or "#") to remove the sensitive or confidential information from the transcript. In some examples, the redaction engine 212 may copy a transcript and perform the redaction on the copied transcript, while retaining the original unredacted transcript (e.g., within the transcript/metadata data store 110). Such examples may allow the redaction engine 212 to perform multiple different redactions of the same transcript, which may be used for different purposes (e.g., transmission to different downstream systems).

Figure 4C:
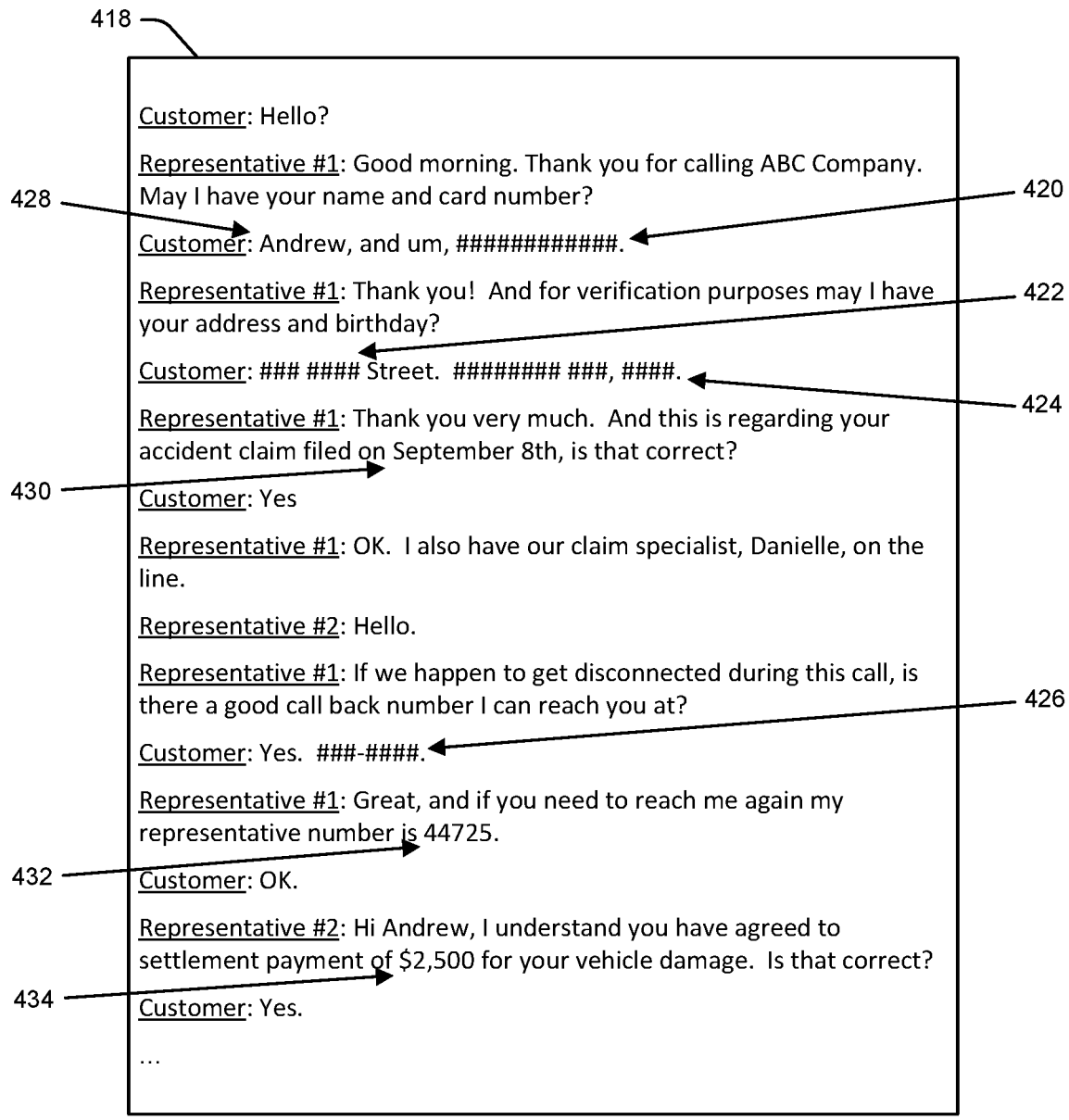

FIG. 4C shows another updated transcript file 418 in the multi-stage redaction operation, in which transcript text file 492 from FIG. 4B has been modified redacted by the redaction engine 212, based on a set of regexs selected by the regex selector 210. In this example, redaction engine 212 has redacted sensitive or confidential information at text locations 420, 422, 424, and 426. Although the redacted information in this example includes numbers, it can be understood from the context of this disclosure that the redacted data is not limited to numeric information, but may include text, numbers, or any combination of text and numbers. For instance, the redaction system 102 may be configured to redact primarily numeric data (e.g., account numbers, payment card numbers, SSNs, PINS, phone numbers, etc.), text data (e.g., names, locations, security question responses, etc.), and/or text-number combinations such as addresses, birthdays, alphanumeric account numbers or passwords, biometric data, etc.).

The transcript file 418 depicts several examples of sensitive or confidential information that has been redacted from the previous transcript files 400 and 402. At text location 420, the customer's account number has been redacted based on an organization-specific regex matching the acceptable pattern(s) of account numbers used by the organization. At text location 422, the redaction system 102 has redacted the customer's address, but has retained the word "Street" to convey to the downstream analytics systems 106 that the customer's address was provided that point in the conversation. At text location 424 the redaction system 102 has redacted the customer's birthday, and at text location 426, the redaction system 102 has redacted the customer's phone number.

The transcript file 418 also identifies additional text locations 428, 430, 432, and 432 at which certain text has not been redacted. In this example, the customer's birthday at location 424 has been redaction, by the claim filing date at location 430 has not been redacted. Additionally, the customer's account number at location 420 has been redacted, by the customer's name at location 428 and the representative's identification number at location 432 have not been redacted. The settlement payment dollar amount at location 434 also has not been redacted. As described above, the specific redactions performed and not performed by the redaction engine 212 may be based on the particular regexs selected and customized for redacting transcript 400, which may be determined using any combination of the transcript data and/or transcript analysis techniques described herein, such as a set of organization-specific redaction rules, the transcript categories, the communication service 104 from which the transcript was received, the downstream analytics system 106 to which the redacted transcript is to be transmitted, the transmission network 112, etc. In some examples, the redaction engine 212 also may apply redaction rules in addition to the selected regexs, that control which matching text patterns within the transcript are redacted and which are not. For instance, the redaction engine 212 may apply a speaker-based redaction rule, such as matching regexs spoken/typed by the customer will be redacted, but matching regexs spoken/typed by a representative will not be redacted.

Figure 5:
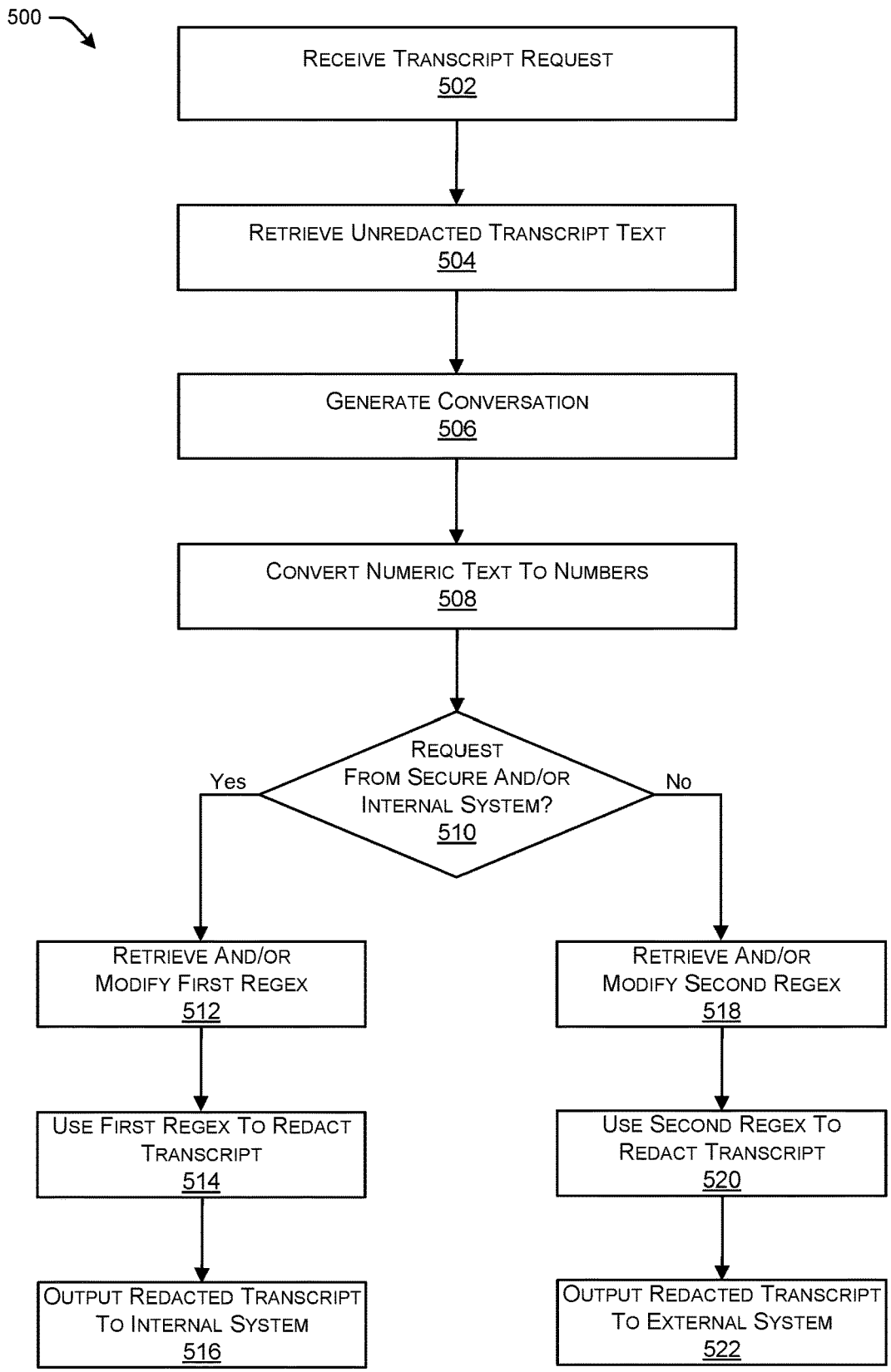
FIG. 5 is a flow diagram illustrating an example process of performing a targeted transcript redaction based on a transcript request received from an internal and/or external system, in accordance with one or more examples of the present disclosure.

FIG. 5 is a flow diagram illustrating a process 500 of performing a targeted transcript redaction based on a received transcript request. For instance, process 500 may relate to implementations in which a downstream analytics system 106 requests a batch of transcripts, or registers to receive a stream of transcripts, from an automated contact center. The techniques and operations of process 500 may be performed by a redaction system 102 associated with the contact center environment, alone or in combination with any of the additional components described above in FIGS. 1 and 2. As described below, in this example the redaction system 102 may determine and apply regexs to redact the requested transcripts, based on the security characteristics and/or other attributes of the downstream analytics system 106 and/or other attributes of the requested transcripts.

At operation 502, the redaction system 102 receives a transcript request from a requesting computing system. As noted above, the requesting computing system may be a downstream analytics system 106 requesting transcripts on which to perform analytics operations. Such requests may include requests for individual transcripts, batches of transcripts, and/or streams of transcripts representing customer interaction records within a contact center environment.

At operation 504, the redaction system 102 retrieves one or more unredacted transcript texts based on the transcript request received at operation 502. In some examples, the redaction system 102 may receive or retrieve unredacted transcript texts from communication services 104 of a contact center. Additionally or alternatively, the redaction system 102 may retrieve partially or fully unredacted transcripts from a transcript/metadata data store 110 responsive to the request.

At operation 506, the redaction system 102 may use a conversation generator 202 to analyze and convert the unredacted transcript text into a conversation format. As described above, in some cases the conversation generator 202 may generate transcript conversations based on the transcript words, timestamp data, speaker identifiers, and/or associated confidence data. The conversation generator 202 also may perform language and context analysis to generate the unredacted text transcript in a conversational format.

At operation 508, the redaction system 102 may use a numeric convertor 208 to convert the numerical text in the unredacted transcript into numbers. As discussed above, the numeric convertor 208 also may include a format convertor in some cases, configured to detect types of numeric data and reformat the numeric data based on the data type.

At operation 510, the redaction system 102 determines the security characteristics associated with the transcript request. For instance, in this example the regex selector 210 of the redaction system 102 may determine whether the downstream analytics system 106 requesting the transcript (s) is an internal system within the contact center environment. If the downstream analytics system 106 is an internal system (510: Yes), then the redaction system 102 may use one set of regexs in operations 512-516. In contrast, if the downstream analytics system 106 is an external system (510: No), then the redaction system 102 may use a different set of regexs in operations 518-522. In these examples, operations 512 and 518 may be performed by a regex selector 210 as described above, in which regex(s) are selected, retrieved, and/or modified based on the security characteristics of the downstream analytics system 106 and/or the transmission network 112. Additionally, although not shown in this example, in operations 512 and 518 the redaction system 102 may select or modify the regexs based various categorization analyses, transcript confidence analyses, and transcript metadata analyses, in conjunction with or prior to the determination of the regexs to be used for redaction the transcripts.

Operations 514 and 520 may include using the regex(s) determined and/or modified in the previous steps to redact the transcript. During the redaction of operations 514 and/or 520, the redaction engine 212 of the redaction system 102 may identify and redact (e.g., remove or replace) any text within the transcript matching the search patterns defined by the regexs. For instance, the redaction engine 212 may execute the selected regexs to perform the targeted redaction based on the security characteristics of the downstream analytics system 106 and transmission network 112. Operations 516 and 522 may performed by an output component of the redaction system 102 and/or other components contact center environment. In various examples, in operations 516 and 522 the redaction system may directly transmit the redacted transcripts to the downstream analytics system 106, may make the redacted transcripts available via output queues, or may store the redacted transcripts in a separate storage system accessible to the downstream analytics system 106.

Figure 6:
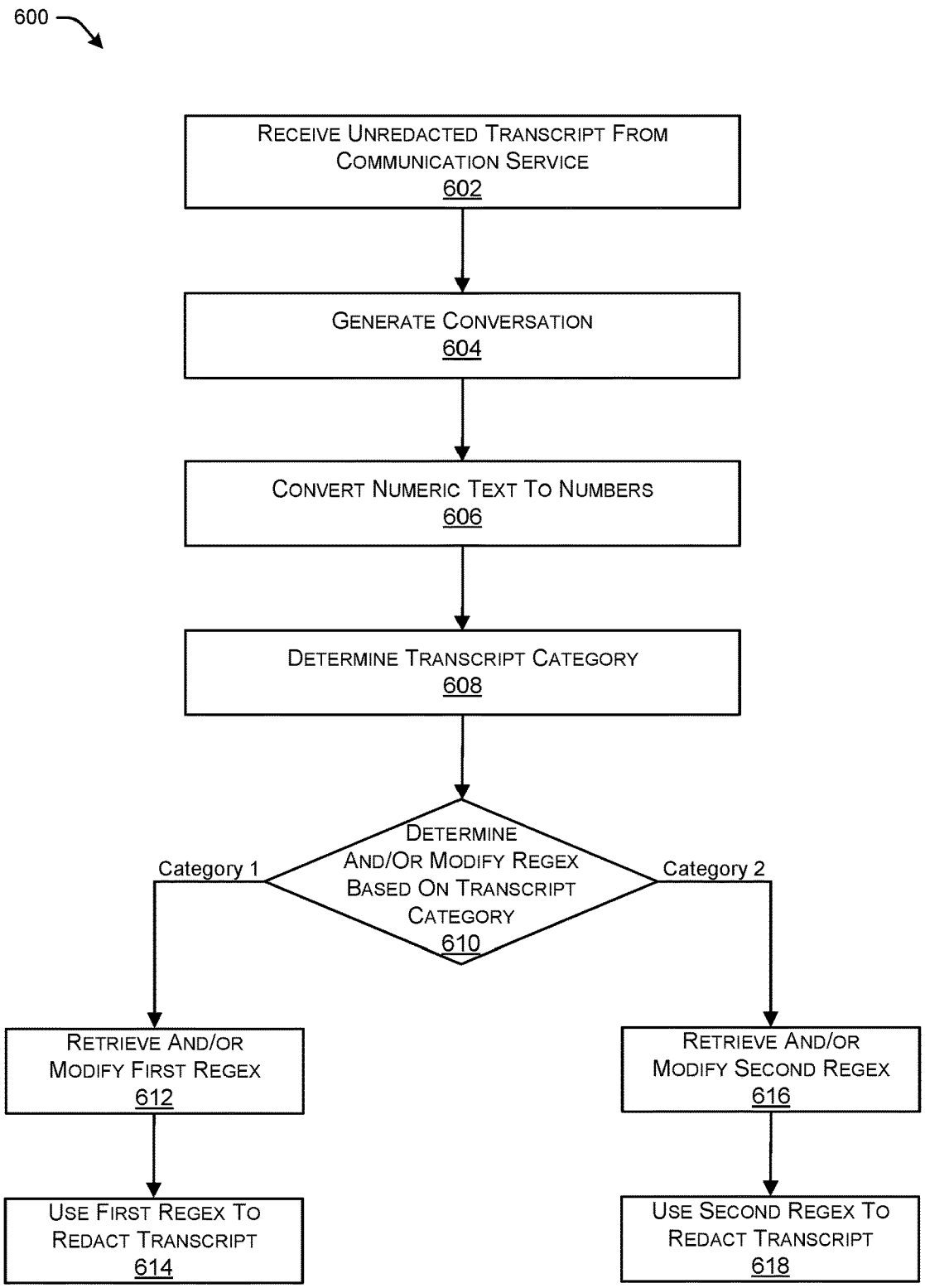
FIG. 6 is a flow diagram illustrating an example process of performing a targeted transcript redaction based on transcript text received from a communication service within a contact center environment, in accordance with one or more examples of the present disclosure.

FIG. 6 is a flow diagram illustrating a process 600 of performing a targeted transcript redaction based on a transcript text received from a communication service in an automated contact center environment. As discussed below, process 600 may relate to implementations in which a redaction system 102 associated with a contact center environment analyzes unredacted transcripts and performs targeted transcript redactions based on the analyses of the transcripts. For instance, the targeted transcript redactions may include determining and performing redactions based on organization-specific redaction requirements, transcript categorization, confidences levels associated with the transcript, security characteristics, and/or other attributes associated with the communication services 104 providing the unredacted transcripts and the downstream analytics systems 106 consuming the redacted transcripts. In some examples, the techniques and operations of process 600 may be performed by a redaction system 102 associated with the contact center environment, alone or in combination with any of the additional components described above in FIGS. 1 and 2.

At operation 602, the redaction system 102 receives an unredacted transcript from a communication service or other document source system. For example, the redaction system 102 may receive unredacted transcript text from any of the communication services 104A-104D described above, and the transcript texts may correspond to interaction records between customers and representatives in a contact center environment. As noted above, in other examples the redaction system 102 may receive, analyze, and redact any other type of transcript or other documents that potentially includes sensitive or confidential information.

At operation 604, the redaction system 102 may use a conversation generator 202 to analyze and convert the unredacted transcript text into a conversation format. As described above, in some cases the conversation generator 202 may generate transcript conversations based on the transcript words, timestamp data, speaker identifiers, and/or associated confidence data. The conversation generator 202 also may perform language and context analysis to generate the unredacted text transcript in a conversational format.

At operation 606, the redaction system 102 may use a numeric convertor 208 to convert the numerical text in the unredacted transcript into numbers. As discussed above, the numeric convertor 208 also may include a format convertor in some cases, configured to detect types of numeric data and reformat the numeric data based on the data type.

At operation 608, the redaction system 102 may determine a category of the unredacted transcript. As discussed below, the redaction system 102 may use the transcript category and/or additional data to determine the regexs to use to redact the transcript. In some examples, the redaction system 102 may use a transcript analysis component 206 configured to detect keywords, analyze metadata, and/or perform other analyses to determine one or more categories associated with the unredacted transcript. Different transcript categories may be supported by the redaction system 102 in different implementations, including subject matter classifications of the transcript, organization departments associated with the transcript, customer type categories, language categories, contact session resolution categories, and the like. This example depicts operation 608 as classifying the unredacted transcript into one of two categories. However, in other examples the redaction system 102 may determine any number of categories for a transcript, including combinations of categories from different category types (e.g., a topic category, a language category, a customer and/or representative type category, etc.), and the redaction system 102 may determine regexs based on the combination of categories of the transcript.

In this example, if the redaction system 102 determines that the transcript is associated with a first category (610: Category 1), then at operation 612 the redaction system 102 uses a regex selector 210 to retrieve/modify a first set of regexs based on the first category, and at operation 614 the redaction system 102 redacts the transcript using the first set of regexs. Instead, if the redaction system 102 determines that the transcript is associated with a second category (610: Category 2), then at operation 616 the redaction system 102 uses the regex selector 210 to retrieve/modify a second set of regexs based on the second category, and at operation 618 the redaction system 102 redacts the transcript using the second set of regexs. In operations 614 and 618, the redaction system 102 may use a redaction engine 212 to execute the determined set of regexs. During the redaction operations, the redaction engine 212 may compare the text search patterns of the regex(s) to the text of the unredacted transcript. Any text portions found within the transcript that match the text string patterns of the regex may be removed or replaced, thereby redacting the sensitive or confidential information in the transcript in a limited and targeted manner that preserves additional non-sensitive and non-confidential information.

Figure 7:
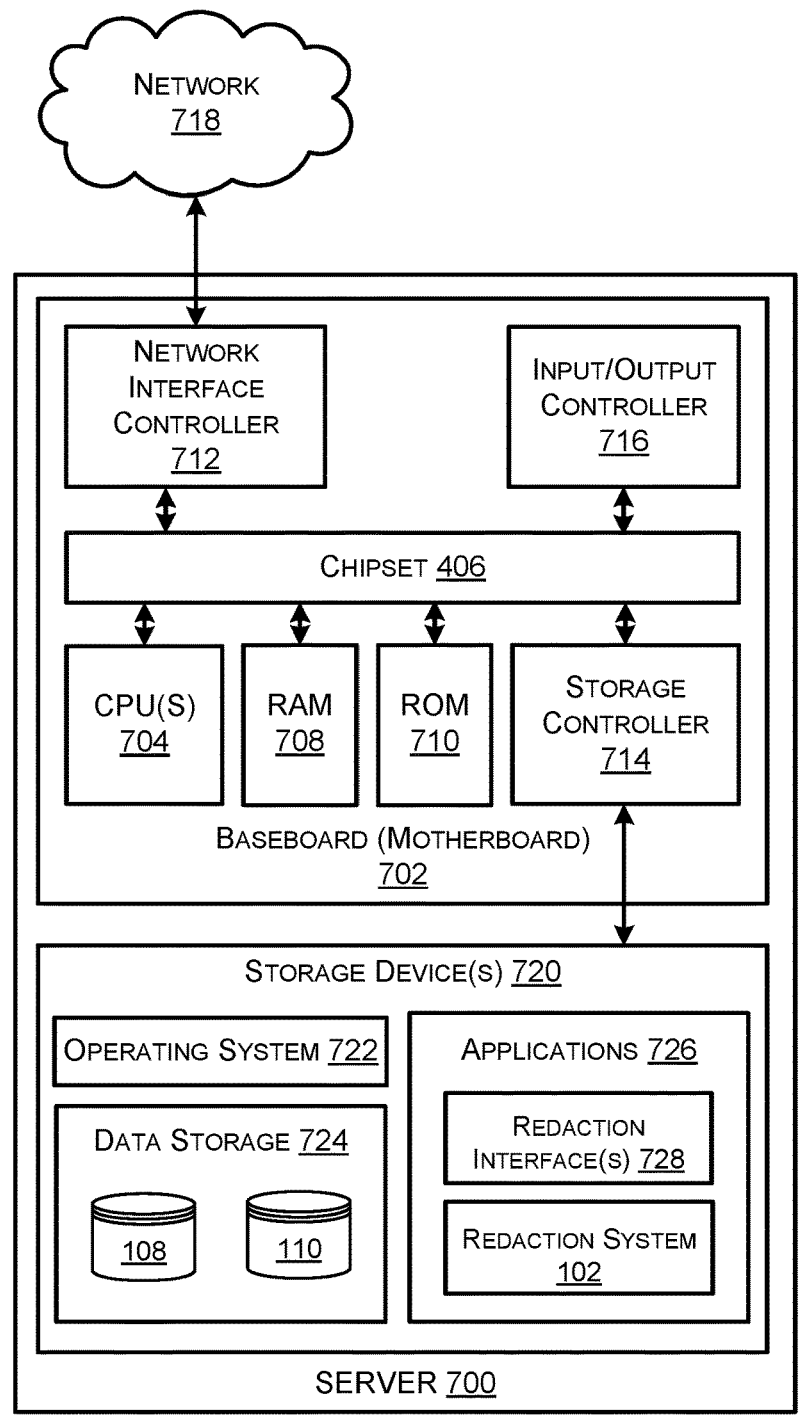
FIG. 7 is an example architecture of a computer server capable of executing program components for implementing various techniques described herein.

FIG. 7 shows an example computer architecture for a server 700 capable of executing program components for implementing the various functionality described herein. Although the computer architecture shown in FIG. 7 is labeled as a computer server, similar or identical computer architectures may be implemented via workstations, desktop or laptop computers, tablet computers, network appliances, mobile devices (e.g., smartphones, etc.) or other computing device, and/or virtual machines or cloud-based computing solutions, any or all of which may execute any combination of the software components described herein. The server 700 may, in some examples, correspond to any of the computing systems or devices described above, such as a redaction system 102, communication service 104, analytics system 106 and/or any other computing devices or servers executing the software components described herein. It will be appreciated that in various examples described herein, a server 700 might not include all of the components shown in FIG. 7, may include additional components that are not explicitly shown in FIG. 7, and/or may utilize a different architecture from that shown in FIG. 7.

The server 700 includes a baseboard 702, or "motherboard," which may be a printed circuit board to which a multitude of components or devices are connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server 700. The chipset 706 can further provide an interface to a computer-readable storage medium such as a ROM 710 or non-volatile RAM ("NVRAM") for storing basic routines that help to startup the server 700 and to transfer information between the various components and devices. The ROM 710 or NVRAM can also store other software components necessary for the operation of the server 700 in accordance with the configurations described herein.

The server 700 can operate in a networked environment using logical connections to remote computing devices and computer systems through a network, such as the network 718, which may be similar or identical to either or both of the networks 112A and/or 112B discussed above. The chipset 706 also may include functionality for providing network connectivity through a Network Interface Controller (NIC) 712, such as a gigabit Ethernet adapter. The NIC 712 is capable of connecting the server 700 to other computing devices over the network 718. It should be appreciated that multiple NICs 712 can be present in the server 700, connecting the computer to other types of networks and remote computer systems. In some instances, the NICs 712 may include at least on ingress port and/or at least one egress port.

The server 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device.

The server 700 can include one or more storage device(s) 720, which may be connected to and/or integrated within the server 700, that provide non-volatile storage for the server 700. The storage device(s) 720 can store an operating system 722, data storage systems 724, and/or applications 726, which are described in more detail herein. The storage device(s) 720 can be connected to the server 700 through a storage controller 714 connected to the chipset 706. The storage device(s) 720 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server 700 can store data on the storage device(s) 720 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 720 are characterized as primary or secondary storage, and the like.

For example, the server 700 can store information to the storage device(s) 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 700 can further read information from the storage device(s) 720 by detecting the physical states or characteristics of one or more particular locations within the physical storage units.

In addition to the storage device(s) 720 described above, the server 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the server 700. In some examples, the various operations performed by the computing systems described herein (e.g., redaction system 102, communication services 104, analytics system 106, etc.) may be supported by one or more devices similar to server 700. Stated otherwise, some or all of the operations described herein may be performed by one or more server 700 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 720 can store an operating system 722 utilized to control the operation of the server 700. In some examples, the operating system 722 comprises a LINUX operating system. In other examples, the operating system 722 comprises a WINDOWS® SERVER operating system from MICROSOFT Corporation of Redmond, Washington. In further examples, the operating system 722 can comprise a UNIX operating system or one of its variants. It should be appreciated that other operating systems can also be utilized. The storage device(s) 720 can store other system or application programs and data utilized by the server 700.

In various examples, the storage device(s) 720 or other computer-readable storage media is encoded with computer-executable instructions which, when loaded into the server 700, transform the computer from a general-purpose computing system into a special-purpose computer capable of implementing various techniques described herein. These computer-executable instructions transform the server 700 by specifying how the CPUs 704 transition between states, as described above. In some examples, the server 700 may have access to computer-readable storage media storing computer-executable instructions which, when executed by the server 700, perform the various techniques described herein. The server 700 can also include computer-readable storage media having instructions stored thereupon for performing any of the other computer-implemented operations described herein.

As illustrated in FIG. 7, the storage device(s) 720 may store one or more data storage systems 724 configured to store data structures and other data objects. In some examples, data storage systems 724 may include one or more data stores, which may be similar or identical to the regex library 108 and/or the transcripts/metadata data store 110 described above. Additionally, the software applications 726 stored on the server 700 may include one or more client applications, services, and/or other software components. For example, application(s) 726 may include any combination of the components 202-212 within a redaction system 102, and/or other software components described above in reference to FIGS. 1-6.

As illustrated by the above examples, the techniques described herein provide technical advantages which improve the capabilities and functioning of redaction systems specifically, and automated contact centers in general. For example, a redaction system based on the techniques described herein provides improved analytics of call transcripts and other customer interaction records, by performing a limited and targeted redaction of the customer interaction records which preserves more unredacted information for downstream analytics processes. In contrast to conventional redaction systems which may over-redact call transcripts by applying broad text search patterns, the techniques described herein perform targeted redactions by determining specific regular expressions and/or modifying the regular expressions based on early transcript categorizations, organization-specific redaction schemes, the communication services or channels over which the transcript was received, confidence levels associated with the transcript text, and the like. As a result, the redaction systems described herein more effectively protect sensitive and confidential information within customer interaction records, while also preserving more of the non-sensitive and non-confidential information, which improves the capabilities of the downstream analytics processes based on those records.

Additionally, redaction systems implementing the techniques described herein provide additional data security for the sensitive and confidential information stored in customer interaction records. In contrast to conventional redaction systems, the computing architectures described herein provide a secure redaction system within an automated contact center, and need not require uploading or transmitting unredacted texts to external systems or third-party services to perform redaction. Additionally, redaction systems described herein may perform customized redactions based on the security characteristics of the downstream analytics systems requesting the customer interaction records and/or the transmission networks over which the records will be transmitted. The redaction systems described herein may perform a more or less permissive redaction based on the security characteristics of the communication networks and/or downstream systems requesting the redacted data, thereby providing an additional layer of data security that may be adapted and tuned to protect sensitive and confidential information within customer interaction records.

Further, it can be understood from the context of this disclosure that the redaction techniques described herein are applicable in a wide variety of applications and computing environments, and are not limited to the contexts of insurance applications or automated contact center environments. For example, online merchants and other businesses may use the redaction techniques described herein to anonymize or de-identify customer order data by removing particular customer PII and PCI data. Businesses, universities and/or governmental entities also may use the redaction techniques described herein to anonymize or de-identify individual records (e.g., employee records, student records, patient records, etc.), and/or to anonymize information for research or security purposes. Many useful applications are envisioned, and the examples provided herein are not intended to be limiting of such applications.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
receiving, by a first computer system, a transcript text;
determining, by the first computer system, a transcript category associated with the transcript text;
determining, by the first computer system, a first expression based on the transcript category, wherein the first expression defines a first search pattern;
modifying, by the first computer system, the transcript text into a first redacted transcript text wherein modifying the transcript text comprises:
converting, within the transcript text, a non-numeric text string representing a numeric value, into a numeric text string; and
redacting one or more instances of the first search pattern from the transcript text, wherein the one or more instances includes the numeric text string; and
transmitting the first redacted transcript text from the first computer system, via a transmission network, to a second computer system.

2. The method of claim 1, further comprising:
determining a second transcript category associated with the transcript text, based at least in part on the first redacted transcript text;
determining a second expression based at least in part on the second transcript category, wherein the second expression defines a second search pattern; and
modifying the first redacted transcript text into a second redacted transcript text, by redacting one or more instances of the second search pattern from the first redacted transcript text.

3. The method of claim 1, further comprising:
determining an attribute associated with at least one of the second computer system or the transmission network, wherein the first expression is determined based at least in part on the attribute.

4. The method of claim 1, wherein determining the first expression comprises:

retrieving the first expression from a library of expressions, based at least in part on the transcript category; and modifying the first expression based on one or more attributes of the second computer system or the transmission network.

5. The method of claim 1, further comprising:
converting a first text string in the transcript text to a first numeric value; and
determining a first confidence level associated with the first numeric value.

6. The method of claim 1, further comprising:
determining a confidence level associated with a first text string in the transcript text, wherein the first text string corresponds to a numeric value;
determining that the confidence level meets or exceeds a confidence threshold; and
converting the first text string to a number, based at least in part on determining that the confidence level meets or exceeds the confidence threshold.

7. The method of claim 1, further comprising:
determining a first portion of the transcript text associated with a first speaker;
determining a second portion of the transcript text associated with a second speaker; and
determining a second expression associated with the second speaker, wherein the second expression defines a second search pattern different from the first search pattern,
wherein modifying the transcript text comprises:
redacting a first instance of the first search pattern from the first portion of the transcript text; and
redacting a second instance of the second search pattern from the second portion of the transcript text.

8. The method of claim 1, further comprising:
determining a security characteristic associated with the second computer system, wherein determining the first expression is further based on the security characteristic associated with the second computer system.

9. A computer server, comprising:
one or more processors; and
one or more non-transitory computer-readable media storing computer-executable instructions that, when executed by the one or more processors, cause the one or more processors to perform operations comprising:
receiving a transcript text;
determining a transcript category associated with the transcript text;
determining a first expression based on the transcript category, wherein the first expression defines a first search pattern;
modifying the transcript text into a first redacted transcript text, wherein modifying the transcript text comprises:
converting, within the transcript text, a non-numeric text string representing a numeric value, into a numeric text string; and
redacting one or more instances of the first search pattern from the transcript text, wherein the one or more instances includes the numeric text string; and
transmitting the first redacted transcript text from the computer server, via a transmission network, to a second computer system.

10. The computer server of claim 9, the operations further comprising:

determining a second transcript category associated with the transcript text, based at least in part on the first redacted transcript text;
determining a second expression based at least in part on the second transcript category, wherein the second expression defines a second search pattern; and
modifying the first redacted transcript text into a second redacted transcript text, by redacting one or more instances of the second search pattern from the first redacted transcript text.

11. The computer server of claim 9, the operations further comprising:
determining an attribute associated with at least one of the second computer system or the transmission network, wherein the first expression is determined based at least in part on the attribute.

12. The computer server of claim 9, wherein determining the first expression comprises:
retrieving the first expression from a library of expressions, based at least in part on the transcript category; and
modifying the first expression based on one or more attributes of the second computer system or the transmission network.

13. The computer server of claim 9, further comprising:
converting a first text string in the transcript text to a first numeric value; and
determining a first confidence level associated with the first numeric value.

14. The computer server of claim 9, the operations further comprising:
determining a confidence level associated with a first text string in the transcript text, wherein the first text string corresponds to a numeric value;
determining that the confidence level meets or exceeds a confidence threshold; and
converting the first text string to a number, based at least in part on determining that the confidence level meets or exceeds the confidence threshold.

15. The computer server of claim 9, the operations further comprising:
determining a first portion of the transcript text associated with a first speaker;
determining a second portion of the transcript text associated with a second speaker; and
determining a second expression associated with the second speaker, wherein the second expression defines a second search pattern different from the first search pattern,
wherein modifying the transcript text comprises:
redacting a first instance of the first search pattern from the first portion of the transcript text; and
redacting a second instance of the second search pattern from the second portion of the transcript text.

16. One or more non-transitory computer-readable media storing instructions executable by a processor, wherein the instructions, when executed by the processor, cause the processor to perform operations comprising:
receiving a transcript text at a first computer system;
determining an attribute associated with at least one of a second computer system or a transmission network;
determining a first regular expression based on the attribute, wherein the first regular expression defines a first search pattern;
modifying the transcript text into a first redacted transcript text, by wherein modifying the transcript text comprises:

converting, within the transcript text, a non-numeric text string representing a numeric value, into a numeric text string; and redacting one or more instances of the first search pattern from the transcript text, wherein the one or more instances includes the numeric text string; and transmitting the first redacted transcript text from the first computer system, via the transmission network, to the second computer system.

17. The one or more non-transitory computer-readable media of claim 16, the operations further comprising:

determining a transcript category associated with the transcript text, wherein determining the first regular expression is based at least in part on the transcript category.

18. The one or more non-transitory computer-readable media of claim 16, the operations further comprising:

converting a first text string in the transcript text to a first numeric value; and determining a first confidence level associated with the first numeric value, wherein determining the first regular expression is based at least in part on the first confidence level.

19. The one or more non-transitory computer-readable media of claim 16, the operations further comprising:

determining a first portion of the transcript text associated with a first speaker, wherein the first regular expression is associated with the first speaker;

determining a second portion of the transcript text associated with a second speaker; and determining a second regular expression associated with the second speaker, wherein the second regular expression defines a second search pattern different from the first search pattern, wherein modifying the transcript text comprises:

redacting a first instance of the first search pattern from the first portion of the transcript text; and redacting a second instance of the second search pattern from the second portion of the transcript text.

* * * * *